US009456406B2

(12) United States Patent
Niu et al.

(10) Patent No.: US 9,456,406 B2
(45) Date of Patent: Sep. 27, 2016

(54) CELL DISCOVERY AND WAKE UP THROUGH DEVICE-TO-DEVICE DISCOVERY PROTOCOLS

(71) Applicant: Intel IP Corporation, Santa Clara, CA (US)

(72) Inventors: Huaning Niu, Milpitas, CA (US);
Hujun Yin, Saratoga, CA (US);
Pingping Zong, Randolph, NJ (US);
Mo-Han Fong, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 187 days.

(21) Appl. No.: 14/229,652

(22) Filed: Mar. 28, 2014

(65) Prior Publication Data

US 2015/0282051 A1    Oct. 1, 2015

(51) Int. Cl.
*H04W 48/16* (2009.01)
*H04W 68/00* (2009.01)

(52) U.S. Cl.
CPC ........... *H04W 48/16* (2013.01); *H04W 68/005* (2013.01)

(58) Field of Classification Search
CPC .................... H04W 48/16; H04W 68/005
See application file for complete search history.

(56) References Cited

U.S. PATENT DOCUMENTS

| 2010/0214953 | A1 | 8/2010 | Barnum |
| 2011/0268085 | A1* | 11/2011 | Barany ............ H04W 36/0033 370/331 |
| 2013/0250810 | A1 | 9/2013 | Ho et al. |
| 2013/0288668 | A1 | 10/2013 | Pragada et al. |
| 2014/0003373 | A1 | 1/2014 | Hakola et al. |

OTHER PUBLICATIONS

International Search Report and Written Opinion of the International Searching Authority for International Application No. PCT/US2015/018134 mailed on Jun. 6, 2015, 10 pages.

* cited by examiner

*Primary Examiner* — Kashif Siddiqui
(74) *Attorney, Agent, or Firm* — Schwabe Williamson & Wyatt, P.C.

(57) ABSTRACT

Embodiments of the present disclosure are directed towards devices and methods for discovering and waking up dormant access nodes in cellular networks. In one embodiment, the dormant access nodes passively participate in a device-to-device discovery process to identify potential user equipment nearby. Upon identifying a potential user equipment, the dormant access node may wake itself up and inform a serving access node that that is able to service the user equipment. In another embodiment, dormant access nodes may transmit a discovery message periodically. Upon receiving the discovery message a user equipment may report the availability of the dormant access node to its serving access node.

14 Claims, 8 Drawing Sheets

CELL DISCOVERY AND WAKE UP THROUGH DEVICE-TO-DEVICE DISCOVERY PROTOCOLS

FIELD

Embodiments of the present disclosure generally relate to the field of cellular networks, and more particularly, to techniques, and apparatuses employing techniques, for waking up dormant access nodes in a network.

BACKGROUND

As cellular networks become more congested, network operators continue to deploy smaller cells on several orders of magnitude to meet projected demands. The presence of these smaller cells helps offload traffic from the macro cells, but may cause unwanted interference. In some situations, smaller cells may not be actively serving a user, but may continue to transmit at least the downlink common channels. This continued transmission may cause undesirable interference, especially where the density of access nodes is high. Additionally, these continued transmissions may expend energy unnecessarily. Therefore it may be beneficial to have access nodes enter a dormant state when they are not serving a user to limit interference and conserve power.

While placing the access nodes in a dormant state may prevent interference and save power, it creates new challenges for discovery and reactivation of the dormant access nodes. Generally, discovery techniques have relied upon a macro cell (provided by an evolved node B ("eNB")) knowing the location of user equipment and small cells so that the eNB may wake up the small cell when a UE is nearby. This approach has certain drawbacks. First, the position of a UE or small cell may not be accurate or available in some situations, particularly in indoor environments, preventing the eNB from correctly determining if the UE is near a dormant small cell. Second, the eNB may not be aware of some small cells, such as those not deployed by the operator of the eNB, such that the eNB would not be able to wake up these small cells if a UE was nearby.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
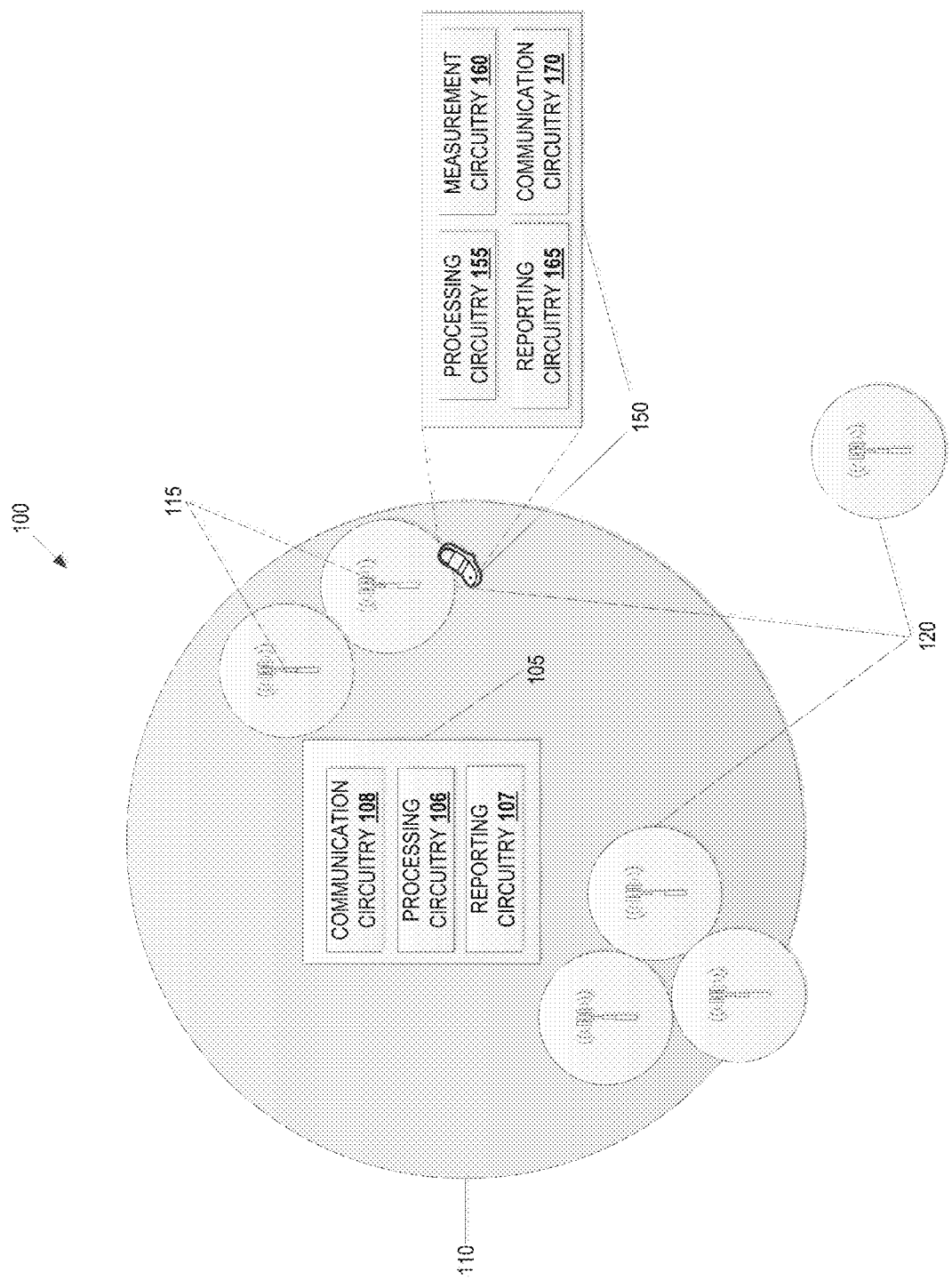
FIG. 1 schematically illustrates a network including a macro cell and a number of small cells in accordance with some embodiments.

Embodiments of the present disclosure describe methods and apparatuses for discovering and waking up dormant access nodes. These embodiments are designed to provide efficient discovery and utilization of access nodes while allowing access nodes to go dormant to conserve power and limit interference.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," "in embodiments," or "in some embodiments," which may each refer to one or more of the same or different embodiments. Furthermore, the terms "comprising," "including," "having," and the like, as used with respect to embodiments of the present disclosure, are synonymous.

The term "coupled with" along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

As used herein, the term "module" may refer to, be part of, or include an Application Specific Integrated Circuit (ASIC), an electronic circuit, a system-on-chip (SoC), a processor (shared, dedicated, or group) and/or memory (shared, dedicated, or group) that execute one or more software or firmware programs, a combinational logic circuit, and/or other suitable components that provide the described functionality.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation FIG. 1 illustrates an exemplary wireless communication network 100, according to one embodiment. The wireless communication network 100 (hereinafter "network 100") may be an access network of a 3rd Generation Partnership Project ("3GPP") long-term evolution ("LTE") network such as evolved universal terrestrial radio access network ("E-UTRAN"). The network 100 features, among other elements, a relatively high-power base station, such as an evolved Node B ("eNB") 105, that is to provide a wireless macro cell 110.

To serve a user equipment ("UE") 150 and otherwise administrate and/or manage wireless communication in the network 100, the eNB 105 may include processing circuitry 106, reporting circuitry 107, and communication circuitry 108. The processing circuitry 106 may be adapted to perform various tasks in the network 100, including, but not limited to, providing a wireless cell that is to serve the UE 150, determining Radio Resource Management ("RRM") metrics that are to be measured and threshold values for those metrics, and processing data received from the UE 150, such as cell identities (e.g., physical layer cell identities and/or global cell identities) and associated RRM measurements. The reporting circuitry 107 may be adapted to transmit data, such as requests and/or configuration information, to the UE 150 and/or a node 115 and receive data (e.g., responses) therefrom. The communication circuitry 108 may be adapted to send and/or receive messages associated with discovery processes. In some embodiments these messages may be associated with device-to-device (D2D) discovery protocols.

In the network 100, the UE 150 is to connect with the eNB 105 where the UE is within the wireless macro cell 110. The UE 150 may be any device adapted to connect with the eNB 105 according to, for example, the 3GPP specification, such as a hand-held telephone, a laptop computer, or other similar device equipped with a mobile broadband adapter. According to some embodiments, the UE 150 may be adapted to administrate one or more tasks in the network 100, including mobility management, call control, session management, D2D discovery, and identity management.

To process data, communicate with the eNB 105 and/or the nodes 115, or otherwise function in the network 100, the UE 150 may include, but is not limited to, processing circuitry 155, measurement circuitry 165, reporting circuitry 160, and communication circuitry 170. The processing circuitry 155 may be adapted to perform a plurality of tasks for the UE 150, such as comparing quality indicators associated with various access nodes and detecting physical signals (e.g., primary synchronization signals, secondary synchronization signals, and/or common reference signals) transmitted by one or both of the eNB 105 and the nodes 115. The measurement circuitry 160 may be adapted to measure quality indicators for access nodes. These measurements may be based at least in part on discovery messages received from the access nodes. The reporting circuitry 160 may be adapted to report the presence of a dormant access node to a serving access node, such at the eNB 105. Finally, the communication circuitry 170 may be adapted to send data to and receive data from the eNB 105, a node 115, or another data source/recipient. The communication circuitry 170, may further be adapted to send and/or receive discovery messages. These discovery messages may be associated with a D2D discovery protocol.

Also included in the wireless network environment 100 is a plurality of low-powered radio access nodes 115. The plurality of low-powered radio access nodes 115 are to provide a plurality of small cells 120. According to the embodiment, the plurality of small cells 120 may be femtocells, picocells, microcells, or essentially any similar cell having a range of about less than two (2) kilometers ("km"). In some arrangements, small cells 120 may have a range of about less than 500 meters. In this arrangement, the UE may be provided both macro-layer and local-node layer coverage. With the benefit of such coverage, the bandwidth and/or network reliability (e.g., near the edge of macro cell 110) may be increased for the UE 150 through such as data offloading, carrier aggregation, and other similar technologies. In the illustrated embodiment, the range of the macro cell 110 may be insufficient to reach each small cell 120 of the plurality, and therefore not all of the plurality of small cells 120 have macro-layer coverage.

Each access node 115, may contain complementary circuitry to eNB 105. For instance, each small cell may include communication circuitry, processing circuitry, and reporting circuitry to perform those functions discussed above. The access nodes 115 providing small cells 120 may be put into a dormant state when they are not serving a UE. When dormant, an access node does not provide a service cell. In some embodiments a dormant access node may not transmit a primary synchronization signal (PSS), a secondary synchronization signal (SSS), or a common reference signal (CRS). As discussed below, a dormant access node may be partially and/or periodically awake to send and/or receive discovery messages in order to participate in discovery and wake up processes. In some embodiments a dormant access node may be able to send and/or receive discovery messages associated with a D2D protocol.

Figure 2:
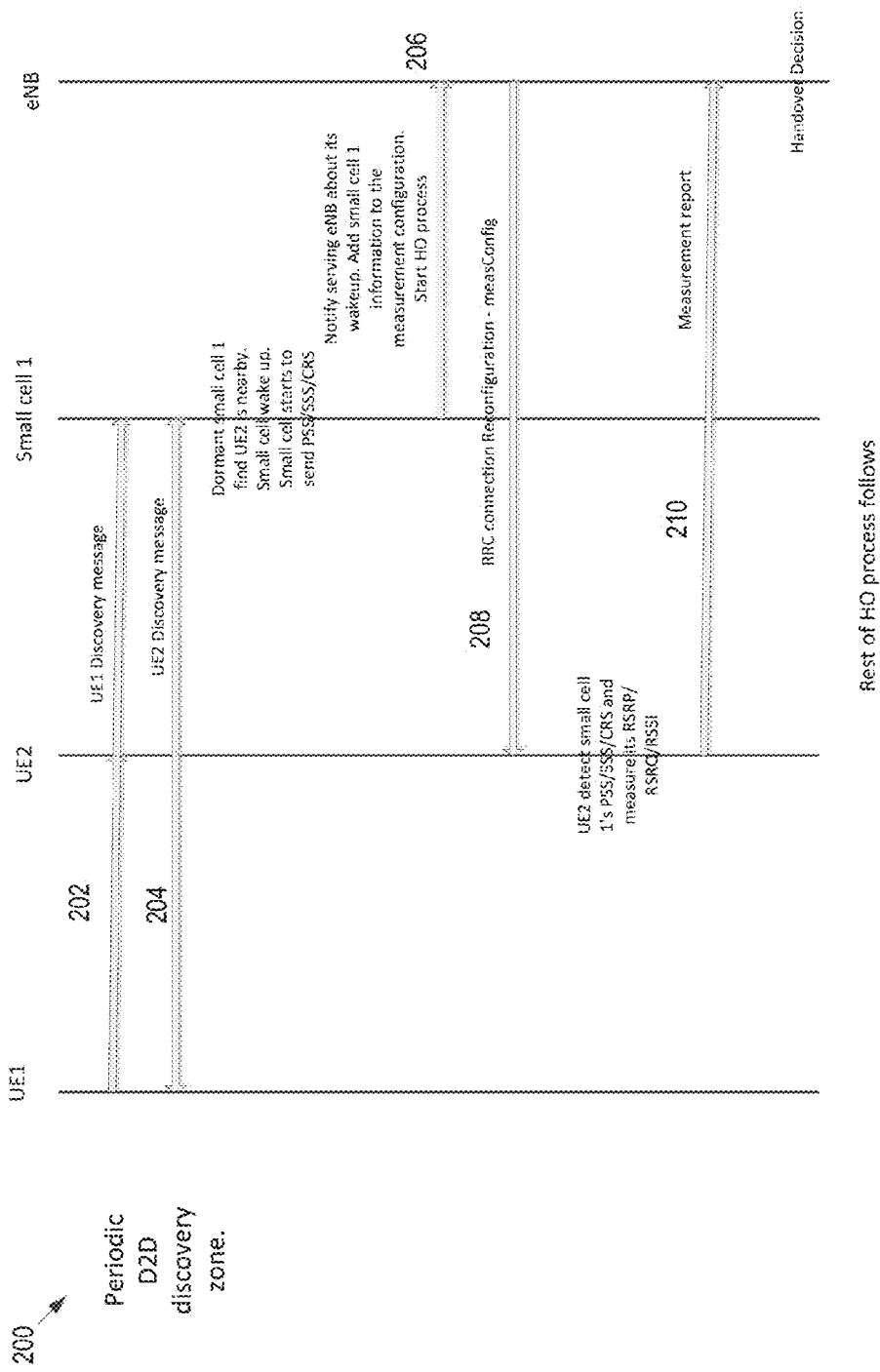
FIG. 2 schematically illustrates an access node discovery and wake up process in accordance with some embodiments.

FIG. 2 illustrates an access node discovery and wake up process 200 in accordance with some embodiments. In the process 200, a dormant access node (indicated by small cell 1 in FIG. 2) may be partially awake during a D2D discovery process to receive discovery messages from UEs that may be near the dormant access node. In this process the dormant small cell may not transmit its own discovery message, but rather may listen for discovery messages to see if one or more UEs are nearby.

A D2D discovery process may occur periodically. During this timeframe each UE may broadcast a discovery message. This can be seen at 202 where UE1 broadcasts a discovery message that may be received by UE2 or small cell 1. Similarly, 204 shows UE2 broadcasting a discovery message that may be received by UE1 or small cell 1. The access node for dormant small cell 1 may wake up partially during the D2D discovery process to listen for discovery messages.

The D2D discovery process may be either network controlled or UE based. For network controlled D2D discovery the network may map UE and small cell IDs to certain discovery beacons. For UE based D2D discovery, discussed in more detail later, the small cell discovery message may include information specifying the small cell ID, the capability of the small cell, as well as other information for use by the UE.

Upon receiving one or more discovery messages, the dormant small cell may find that a UE is nearby and could be served by the small cell. In FIG. 2, small cell 1 finds that UE2 is nearby. Having found that UE2 is nearby, the access node for small cell 1 may wake up and begin providing a service cell. This may include transmitting one or more of a PSS, an SSS, or a CRS. The access node for small cell 1 may also send a message 206 to the access node that is currently serving UE2 (eNB in FIG. 2). This message may indicate that the small cell 1 has woken up, or is in the process of waking up, and that small cell 1 is available to serve UE2. The message may be sent before, after, or simultaneously with the access node for small cell 1 initiating the provision of a service cell. The message may include a request that information regarding small cell 1 be added to a measurement configuration. The message may also include a request for the access node currently serving UE2 to initiate a handover process in order to transfer UE2 from its current service cell to the now active small cell 1. Prior to sending the message, the access node for the dormant small cell may establish a direct connection (e.g., X2 connectivity) with the access node currently serving UE2 to facilitate communication between the access nodes.

Having received a message from the access node for small cell 1, the access node currently serving UE2 (eNB in FIG. 2) may initiate a handover process. This may include adding information regarding small cell 1 to a measurement configuration. The access node currently serving UE2 (eNB in FIG. 2) at 208 may send a radio resource control (RRC) connection reconfiguration message to UE2. The RRC connection reconfiguration message may include a measurement configuration including information regarding small cell 1.

Upon receiving the RRC connection reconfiguration message, UE2 may detect small cell 1. This may include detecting one or more of a PSS, an SSS, or a CRS transmitted by the access node providing small cell 1. UE2 may measure one or more signal characteristics related to small cell 1. This may include measuring one or more of reference signal received power (RSRP), reference signal receive quality (RSRQ), or received signal strength indicator (RSSI) for small cell 1. At 210, UE2 may send a measurement report to the access node currently serving UE2 (eNB in FIG. 2). Based on the measurement report, the access node currently serving UE2 (eNB in FIG. 2) may make a handover decision and a handover process may continue according to any suitable technique, such as those included in the 3GPP LTE specifications.

Thus, by partially waking up during a D2D discovery process a dormant access node may find a nearby UE and wake up to provide a service cell for the UE. In this manner the dormant access node may be woken up based on discovery messages received directly from a UE without relying upon position measurements provided by the network or another access node. This may allow a dormant access node to efficiently detect nearby UEs while preventing the access node from consuming excess power and adding to interference when it is not currently serving a UE.

Although discussed in the context of a dormant access node providing a small cell, the processes discussed herein may also be used to discover and wake up an access node (such as an eNB) providing a macro cell. In general the processes can be used to facilitate discovery and wake up of any dormant access node without regard to size of service cell.

Figure 3:
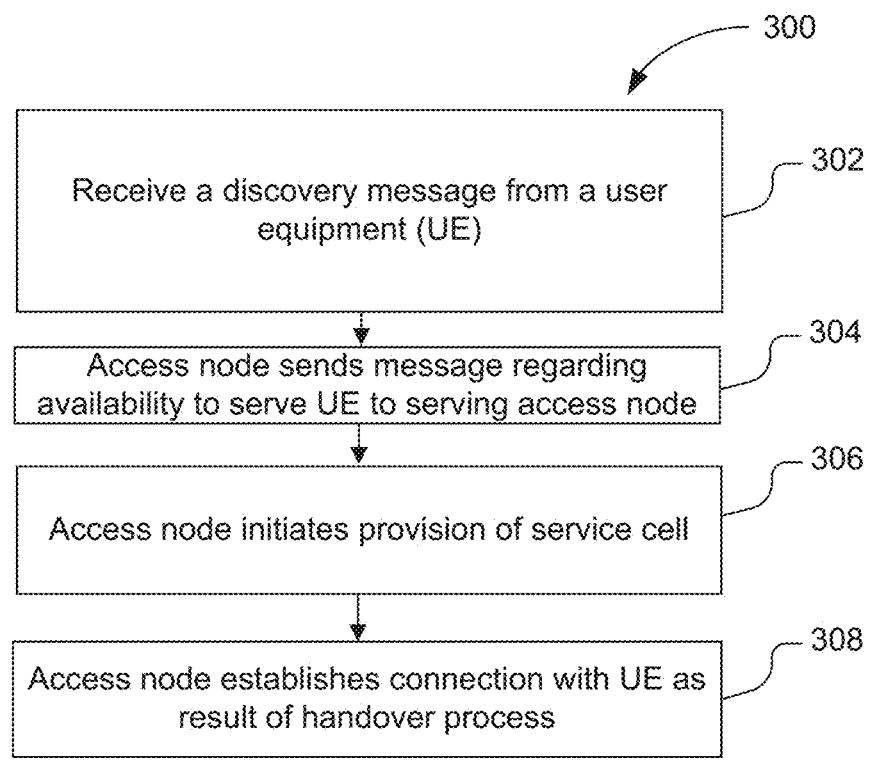
FIG. 3 schematically illustrates a process carried out by a dormant access node consistent with a discovery and wake up process in accordance with some embodiments.

FIG. 3 shows a process 300 by which a dormant access node may detect a nearby UE and wake up consistent with process 200 discussed above. The process 300 may begin at 302 when the dormant access node receives a discovery message from a UE. The discovery message may be associated with a D2D discovery process. The dormant access node may not be serving any UEs and thus may not be transmitting prior to waking up. In some embodiments the access node may stop transmitting when it is not serving a UE. This may include discontinuing transmission of a PSS, an SSS, or CRS, as well as other signals. Based on the discovery message, the access node may determine that the UE is within an area to which the access node could provide service.

The process 300 may continue at 304 with the access node sending a message to the access node currently serving the UE. This may include informing the serving access node that the sending access node is available to the serve the UE. This may also include a request to initiate a hand over process. The message may further include a request that information regarding the sending access node and/or the service cell it can provide be added to a measurement configuration. The access node may establish X2 connectivity with the serving access node to facilitate the messaging process.

The process 300 may continue at 306 with the access node initiating the provision of a service cell. This may include the access node beginning to transmit one or more of a PSS, an SSS, or a CRS.

The process 300 may then continue at 308 when the access node establishes a connection with the UE. This may be the result of a handover process controlled and/or initiated by the access node previously serving the UE.

Figure 4:
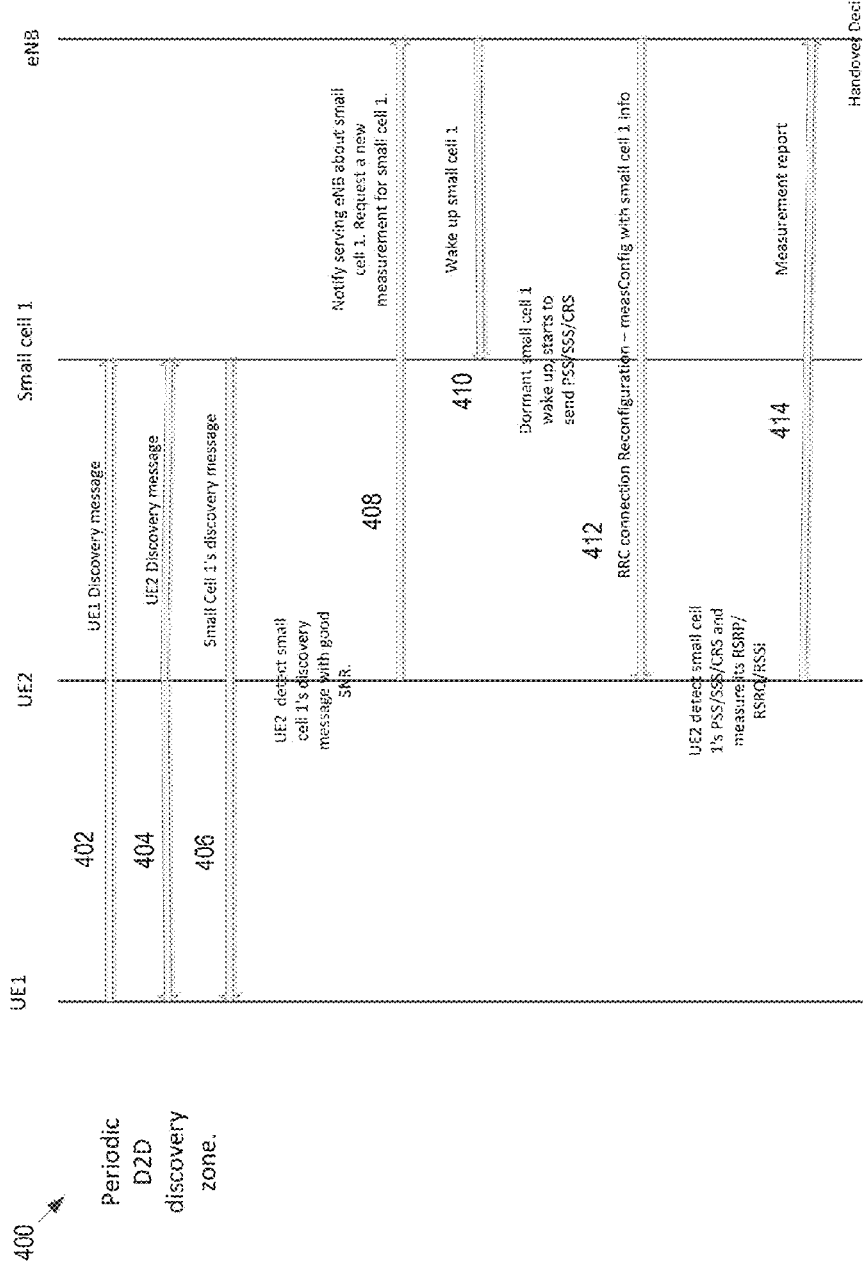
FIG. 4 schematically illustrates an access node discovery and wake up process in accordance with some embodiments.

FIG. 4 shows a UE-driven access node discovery and wake up process 400 in accordance with some embodiments. In process 400, similar to process 200, UE1 and UE2 may transmit discovery messages 402 and 404, respectively, during a D2D discovery process. Unlike process 200, where an access node associated with a dormant small cell (small cell 1) simply listened for UE discovery messages, in process 300, small cell 1 may actively participate in the D2D discovery process. At 406 the access node for small cell 1 broadcasts its own discovery message which may be received by a nearby UE. Small cell 1's discovery message may include information identifying small cell 1 as well information regarding the service area and capabilities of small cell 1.

In process 400, UE2 may be near small cell 1 and thus may detect small cell 1's discovery message and determine that the message exhibits an acceptable quality indication (such as a signal to noise ratio (SNR)). At 408, UE2 may send a message to its serving cell regarding small cell 1. The message may inform the serving cell that small cell 1 is available to serve UE2. The message may also include a request for measurement including small cell 1.

Upon receiving the message regarding small cell 1 from UE2, the serving cell (eNB in FIG. 4) may, at 410, send a message directly to the access node for small cell 1 telling the access node to wake up. Upon receiving this wake up message, the access node for small cell 1 may begin providing a service cell. This may include transmitting one or more of a PSS, an SSS, or CRS. In this manner it is the message from the serving access node that wakes up the dormant access node in process 400.

Having received a message from UE2, the access node currently serving UE2 (eNB in FIG. 2) may initiate a handover process. This may include adding information regarding small cell 1 to a measurement configuration. The access node currently serving UE2 (eNB in FIG. 2) at 412 may send an RRC connection reconfiguration message to UE2. The RRC connection reconfiguration message may include a measurement configuration including information regarding small cell 1.

Upon receiving the RRC connection reconfiguration message, UE2 may detect small cell 1. This may include detecting one or more of a PSS, an SSS, or a CRS transmitted by the access node providing small cell 1. UE2 may measure one or more signal characteristics related to small cell 1. This may include measuring one or more of reference signal received power (RSRP), reference signal receive quality (RSRQ), or received signal strength indicator (RSSI) for small cell 1. At 414, UE2 may send a measurement report to the access node currently serving UE2 (eNB in FIG. 2). Based on the measurement report, the access node currently serving UE2 (eNB in FIG. 2) may make a handover decision and a handover process may continue according to any suitable technique, such as those included in the 3GPP LTE specification.

By allowing the UE to detect the dormant small cell during the D2D discovery process, process 300 may allow the UE to select between a plurality of dormant cells and selectively wake up a particular cell to serve the UE. In this manner, only an access node associated with the service cell to which the UE requests handover needs to be woken up.

In some instances a UE may detect numerous dormant small cells during the D2D discovery. The UE may measure a quality indicator (such as an SNR value) associated with the discovery message for each of the dormant small cells. The UE may then evaluate or compare the quality indicators and select a preferred small cell based on the comparison. The UE may thus be able to evaluate a number of available small cells and send information regarding only the preferred small cell to the serving access node. In this manner, only one of the plurality of small cells is woken up. It is also possible for a UE to send a request to a serving cell with a list of available small cells. The serving cell then may wake up the small cells on the list. The UE may then make a more accurate measurement based on CRS transmission by the woken-up small cells, and send the measurement reports back to the serving cell. The serving cell may then choose one of the small cells with the best RSRP for handover. Other small cells may then be returned to a dormant state.

Process 200 of FIG. 2 may provide less broadcasting by an access node for a dormant small cell because the access node does not transmit during the D2D discovery process, but rather passively listens for nearby UEs. That said, process 200 may result in the access node waking up more frequently than process 400 because the dormant access node will wake up anytime a nearby UE is detected, even though it may not end up serving the UE. For instance, a single UE could be located within a service area covered by multiple small cells. In this situation, according to process 200 each of the small cells would detect the nearby UE and wake up, although the serving access node will only hand the UE over to one of the small cells based on the measurement report it receives from the UE. The UE-driven process 400 on other hand requires more transmitting by the dormant access node, but ensures that only the access node to which the UE is to be handed over is woken up. The configuration of the network, including the density of small cells and the amount of overlapping service area, may render one process more advantageous than the other in certain situations. For instance process 200 may be preferred for networks with fewer small cells and/or less overlapping service area, whereas the UE driven process 400 may be preferred for denser networks or those with more overlapping surface areas (such as networks covering more urban areas with multiples levels of overlapping small cells).

Figure 5:
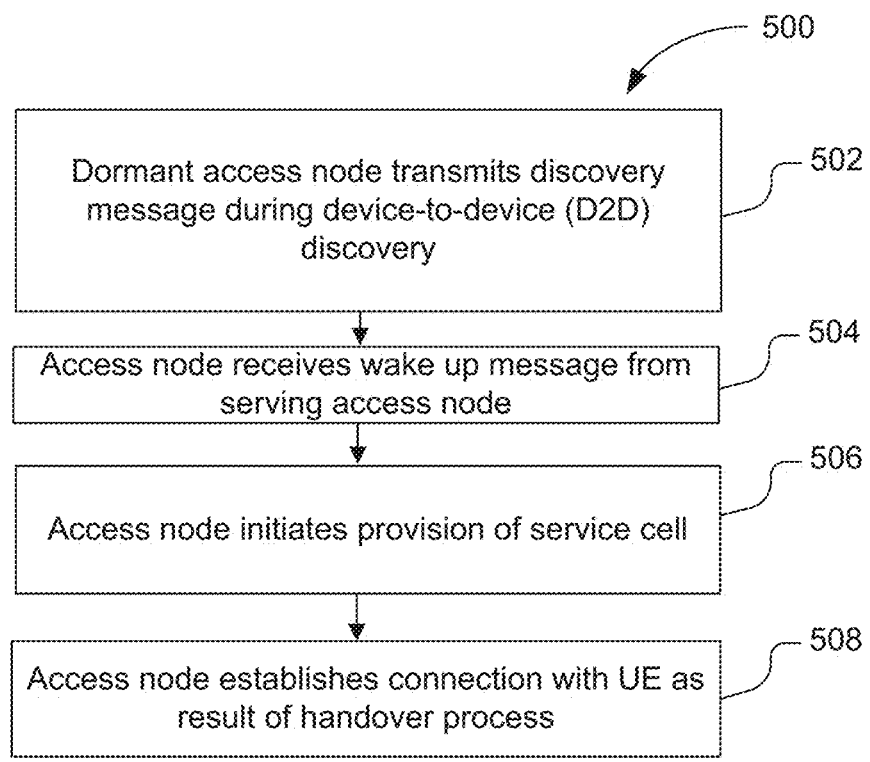
FIG. 5 schematically illustrates a process carried out by a dormant access node consistent with a discovery and wake up process in accordance with some embodiments.

FIG. 5 shows a process 500 by which a dormant access node may be woken up consistent with process 400 discussed above. The process 500 may begin at 502 when the dormant access node transmits a discovery message during a D2D discovery process. The discovery message may include information identifying a service cell to be provided by the access node as well information regarding the service area and capabilities of service cell. The dormant access node may not be serving any UEs and thus may not be transmitting prior to waking up (with the exception of periodically transmitting its discovery message). In some embodiments the access node may stop transmitting when it is not serving a UE. This may include discontinuing transmission of a PSS, an SSS, or a CRS, as well as other signals.

The process 500 may continue at 504 with the access node receiving a wake up message from an access node currently serving a UE. The access node currently serving the UE may establish X2 connectivity with the dormant access node to facilitate the messaging process.

The process 500 may continue at 506 with the access node initiating the provision of a service cell. This may include the access node beginning to transmit one or more of a PSS, an SSS, or CRS.

The process 500 may then continue at 508 when the access node establishes a connection with the UE. This may be the result of a handover process controlled and/or initiated by the access node previously serving the UE.

Figure 6:
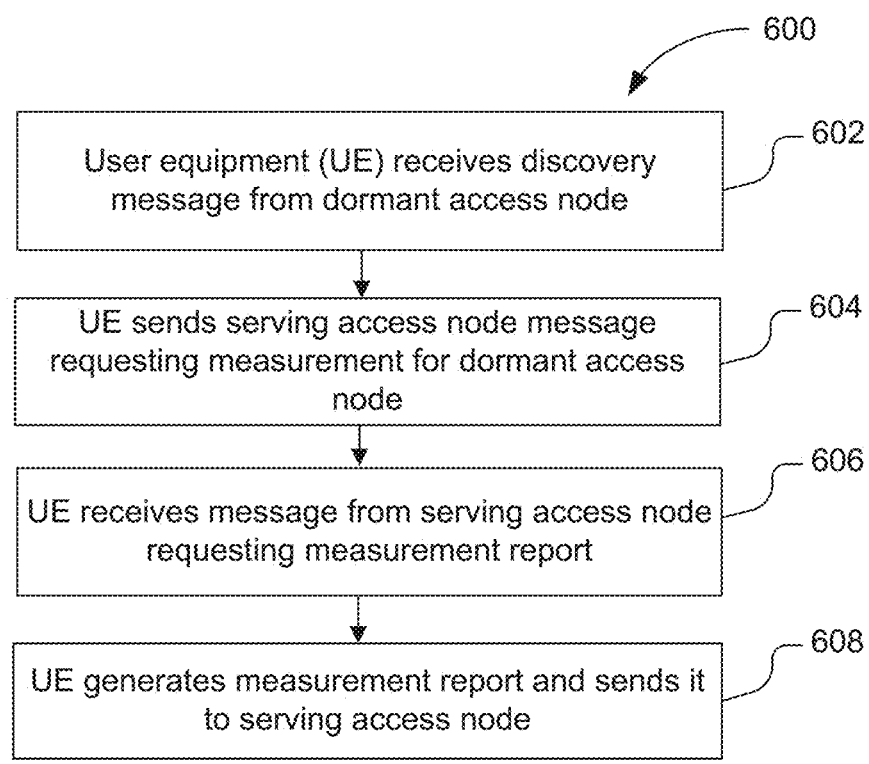
FIG. 6 schematically illustrates a process carried out by a user equipment in a discovery and wake up process in accordance with some embodiments.

FIG. 6 shows a process 600 by which a UE may detect and request wake up of a dormant access node consistent with process 400 discussed above.

The process 600 begins at 602 when the UE receives a discovery message from an access node for dormant service cell. The discovery message may be associated with a D2D discovery protocol. As discussed above, the UE may receive discovery messages from more than one dormant access nodes. In this situation, the UE may measure quality indicators based on the discovery messages and identify a preferred small cell based on the quality indicators.

The process 600 may continue at 604 when the UE sends its serving access node a message regarding the dormant access node. The message may request measurement for a service cell to be provided by the dormant access node. The message may also indicate that the dormant small cell is available to provide service to the UE. The message may also include a request to initiate a handover process.

The process 600 may continue at 606 when the UE receives a message from it serving access node. The message may be an RRC connection reconfiguration message. The message may include a request for measurement report including information regarding the previously dormant service cell.

The process 600 may continue at 608 when the UE generates a measurement report and sends it to its serving access node. This may include detecting one or more of a PSS, an SSS, or a CRS transmitted by the previously dormant access node. This may also include measuring one or more signal characteristics related to the service cell provided by the previously dormant access node. This may include measuring one or more of RSRP, RSRQ, or RSSI for the service cell provided by the previously dormant access node.

Figure 7:
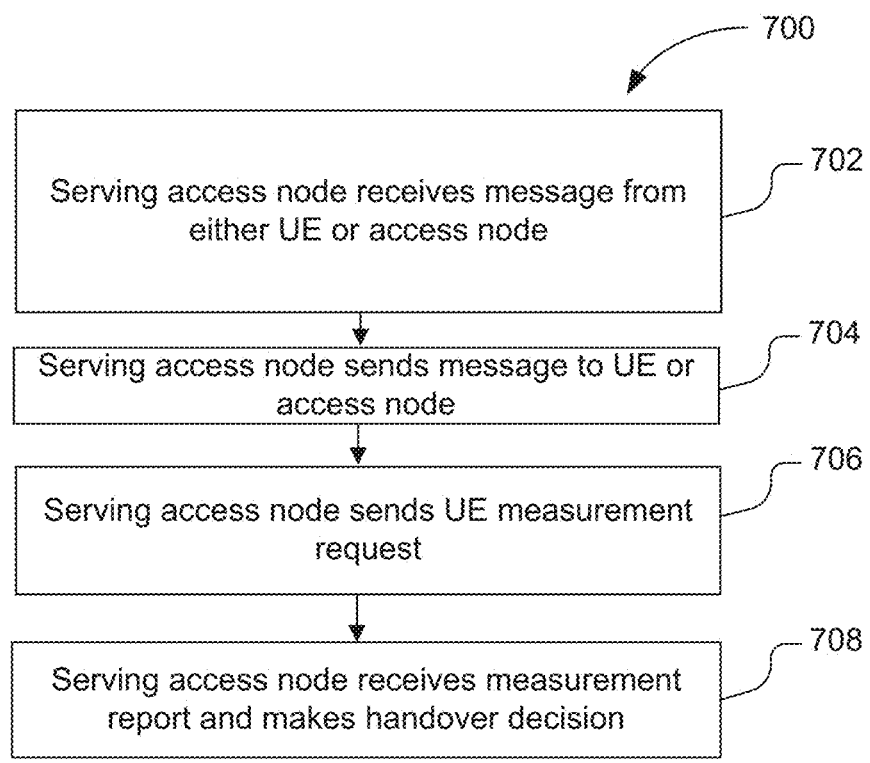
FIG. 7 schematically illustrates a process carried out by a serving access node in a discovery and wake up process in accordance with some embodiments.

FIG. 7 shows a process 700 by which a serving access node may facilitate the wake up of a dormant access node consistent with process 200 or 400 discussed above.

The process 700 may begin at 702 when the serving access node receives a message from either a UE or dormant access node. In some embodiments the message may be from a UE and may be consistent with message 408 of process 400 and/or operation 604 of process 600 as discussed above. In some embodiments, the message may be from a dormant access node and may be consistent with 206 in process 200, and/or operation 304 of process 300.

The process 700 may continue at 704 when the serving access node sends a message to a UE or an access node. In some embodiments the message may be sent to a UE and may be consistent with 208 of process 200 and/or operation 606 of process 600. In some embodiments the message may be sent to an access node and may be consistent with 410 of process 400 and/or operation 504 of process 500.

The process 700 may continue at 706 when the serving access node sends a measurement request to a UE. This may be consistent with 412 of process 400. When facilitating process 200, the serving access node may only send a single message to the UE (and not to the dormant access node) such that operation 706 may not be performed. When facilitating process 400, though, the serving access node may first send a message to the dormant access node (410 of process 400 mentioned above) and then subsequently send a separate measurement request to a UE (412 of process 400). As such, in some embodiments the serving access node may only send a message to the UE as part of the process, whereas in other embodiments the serving access node may send message to both the dormant access node and the UE as part of the process.

The process 700 may continue at 708 when the serving access node receives a measurement report from a UE and makes a handover decision based at least in part of the measurement report. This may by consistent with 210 of process 200, 414 of process 400, and/or operation 608 of process 600.

Figure 8:
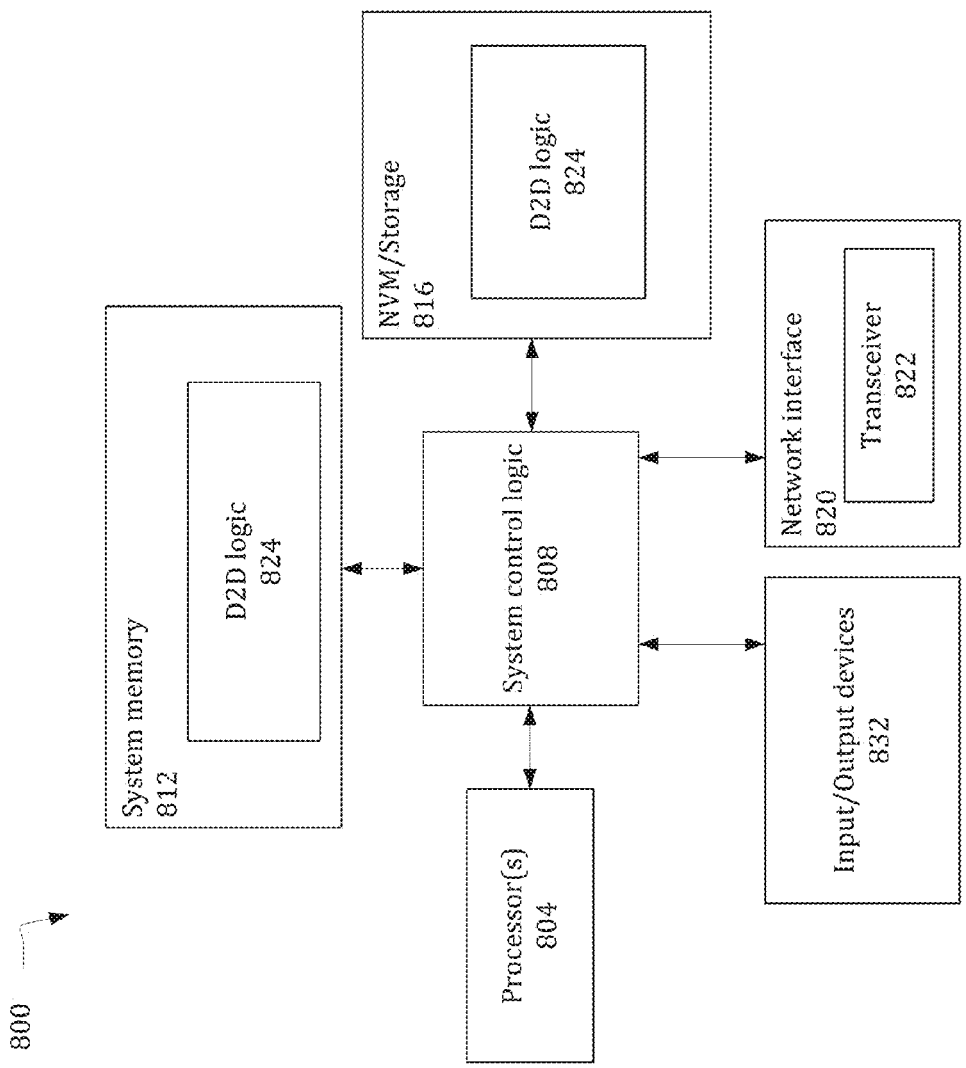
FIG. 8 schematically illustrates a system for implementing discovery and wake up processes in accordance with some embodiments.

The various circuitry and related functionality described herein may be implemented into a system using any suitable hardware and/or software to configure as desired. FIG. 8 illustrates, for one embodiment, an example system 800 comprising one or more processor(s) 804, system control logic 808 coupled with at least one of the processor(s) 804, system memory 812 coupled with system control logic 808, non-volatile memory (NVM)/storage 816 coupled with system control logic 808, a network interface 820 coupled with system control logic 808, and input/output (I/O) devices 832 coupled with system control logic 808.

The processor(s) 804 may include one or more single-core or multi-core processors. The processor(s) 804 may include any combination of general-purpose processors and dedicated processors (e.g., graphics processors, application processors, baseband processors, etc.). Processor(s) 804 may incorporate an applications processor, a graphics processor, and a modem (such as an LTE modem) or any combination of such elements. For instance, in some embodiments, processor(s) 804 may include an integrated applications processor and LTE modem. In one embodiment, processor(s) 804 may be an Intel® XMM™ 8160 chip.

System control logic 808 for one embodiment may include any suitable interface controllers to provide for any suitable interface to at least one of the processor(s) 804 and/or to any suitable device or component in communication with system control logic 808.

System control logic 808 for one embodiment may include one or more memory controller(s) to provide an interface to system memory 812. System memory 812 may be used to load and store data and/or instructions, e.g., D2D logic 824. System memory 812 for one embodiment may include any suitable volatile memory, such as suitable dynamic random access memory (DRAM), for example. NVM/storage 816 may include one or more tangible, non-transitory computer-readable media used to store data and/or instructions, e.g., D2D logic 824. NVM/storage 816 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 816 may include a storage resource physically part of a device on which the system 800 is installed or it may be accessible by, but not necessarily a part of, the device. For example, the NVM/storage 816 may be accessed over a network via the network interface 820 and/or over Input/Output (I/O) devices 832.

The D2D logic 824 may include instructions that, when executed by one or more of the processors 804, cause the system 800 to perform operations associated with the components of the various circuitry and processes as described with respect to the above embodiments. In various embodiments, the D2D logic 824 may include hardware, software, and/or firmware components that may or may not be explicitly shown in system 800.

Network interface 820 may have a transceiver 822 to provide a radio interface for system 800 to communicate over one or more network(s) and/or with any other suitable device. In various embodiments, the transceiver 822 may be integrated with other components of system 800. For example, the transceiver 822 may include a processor of the processor(s) 804, memory of the system memory 812, and NVM/Storage of NVM/Storage 816. Network interface 820 may include any suitable hardware and/or firmware. Network interface 820 may include a plurality of antennas to provide a multiple input, multiple output radio interface. Network interface 820 for one embodiment may include, for example, a wired network adapter, a wireless network adapter, a telephone modem, and/or a wireless modem.

For one embodiment, at least one of the processor(s) 804 may be packaged together with logic for one or more controller(s) of system control logic 808. For one embodiment, at least one of the processor(s) 804 may be packaged together with logic for one or more controllers of system control logic 808 to form a System in Package (SiP). For one embodiment, at least one of the processor(s) 804 may be integrated on the same die with logic for one or more controller(s) of system control logic 808. For one embodiment, at least one of the processor(s) 804 may be integrated on the same die with logic for one or more controller(s) of system control logic 808 to form a System on Chip (SoC).

In various embodiments, the I/O devices 832 may include user interfaces designed to enable user interaction with the system 800, peripheral component interfaces designed to enable peripheral component interaction with the system 800, and/or sensors designed to determine environmental conditions and/or location information related to the system 800.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, an Ethernet connection, and a power supply interface.

In various embodiments, the sensors may include, but are not limited to, a gyro sensor, an accelerometer, a proximity sensor, an ambient light sensor, and a positioning unit.

In various embodiments, the system 800 may be a mobile computing device such as, but not limited to, a laptop computing device, a tablet computing device, a netbook, a smartphone, etc. In various embodiments, system 800 may have more or less components, and/or different architectures. In various embodiments, the system 800 may be an access node such an eNB or a lower power access node associated with a small cell.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

EXAMPLES

Some non-limiting examples are provided below.

Example 1 includes an apparatus to be implemented in a first access node, the apparatus comprising: communication circuitry to receive a discovery message from a user equipment (UE); processing circuitry to initiate provision of a service cell by the first access node based at least in part on the discovery message; and reporting circuitry to send a message to a second access node, which serves the UE prior to provision of the service cell by the first access node based at least in part of the discovery message, to indicate that the first access node is available to serve the UE.

Example 2 includes the apparatus of example 1, wherein the processing circuitry is to initiate the transmission of at least one of a primary synchronization signal (PSS), a secondary synchronization signal (SSS), or a common reference signal (CRS) upon initiating provision of the service cell.

Example 3 includes the apparatus of example 1, wherein the first access node serves a first service area and the second access node serves a second service area; and wherein the first service area and the second service area at least partially overlap.

Example 4 includes the apparatus of example 3, wherein the first service area is smaller than the second service area.

Example 5 includes the apparatus of example 3, wherein the first service area is substantially equal to the second service area.

Example 6 includes apparatus of example 1, wherein the message to the second access node includes a request for the second access node to initiate a handover procedure.

Example 7 includes the apparatus of example 1, wherein the message to the second access node includes a request that information regarding the service cell provided by the first access node be included in the serving cell measurement configuration.

Example 8 includes the apparatus of any of examples 1-7, wherein the discovery message is associated with a device-to-device (D2D) discovery protocol.

Example 9 includes an apparatus to be implemented in a first access node, the apparatus comprising: communication circuitry to: transmit a discovery message; and receive a wake up message from a second access node; processing circuitry to initiate provision of a service cell by the first access node based at least in part on the wake up message.

Example 10 includes the apparatus of example 9, wherein the processing circuitry is further to initiate the transmission of at least one of a primary synchronization signal (PSS), a secondary synchronization signal (SSS), or a common reference signal (CRS) upon the first access node initiating provision of a service cell.

Example 11 includes the apparatus of example 10, wherein prior to receiving a wake up message the first access node does not transmit PSS, SSS, or CRS when it is not serving a UE.

Example 12 includes the apparatus of any of examples 9-11, wherein the discovery message is associated with a device-to-device (D2D) discovery protocol.

Example 13 includes an apparatus to be implemented in a user equipment (UE), the apparatus comprising: a communication circuitry to receive a discovery message from a first access node; and reporting circuitry to send a message to a second access node requesting a measurement for the first access node.

Example 14 includes the apparatus of example 13, further comprising measurement circuitry to measure a quality indicator based on the discovery message from the first access node;

Example 15 includes the apparatus of example 14, wherein the quality indicator is a signal to noise ratio (SNR).

Example 16 includes the apparatus of example 13, wherein the communication circuitry is further to receive a discovery message from at least one additional access node;

and the apparatus also includes: measurement circuitry to measure a first quality indicator based on the discovery message from the first access node and a second quality indicator based on the discovery message from the at least one additional access node.

Example 17 includes the apparatus of example 16, wherein the apparatus also includes processing circuitry communicatively coupled with the reporting circuitry, to: compare the first and second quality indicators; identify a preferred access node based on the comparison; and send information regarding the preferred access node to the reporting circuitry for reporting.

Example 18 includes the apparatus of example 13, wherein the communication circuitry is further to receive a message from the second access node requesting that the UE generate a measurement report related to the first access node.

Example 19 includes the apparatus of any of examples 13-18, wherein the discovery message from the first access node is associated with a device-to-device (D2D) discovery protocol.

Example 20 includes an apparatus to be implemented in an evolved Node B (eNB), the apparatus comprising: communication circuitry to receive a first message from one of a user equipment (UE) or an access node regarding the availability of an access node to serve the UE; reporting circuitry to send a second message to the other of the UE or the access node regarding one of the availability of the access node or the presence of the UE.

Example 21 includes the apparatus of example 20, wherein the first message is from a UE and includes a request for measurement for the access node.

Example 22 includes the apparatus of example 21, wherein the second message is sent to the access node and includes a wake up command.

Example 23 includes the apparatus of example 20, wherein the first message is from an access node and includes a request for handover of a particular UE.

Example 24 includes the apparatus of example 20, wherein the reporting circuitry is further to send to the UE a request for measurement report related to the access node in place of, or in addition to, the second message.

Example 25 includes the apparatus of any of examples 20-24, wherein the first message is associated with a device-to-device (D2D) discovery protocol.

What is claimed is:

1. An apparatus to be implemented in a first access node, the apparatus comprising:
   communication circuitry to receive a discovery message from a user equipment (UE), wherein the discovery message is associated with a device-to-device (D2D) discovery protocol;
   processing circuitry to initiate provision of a service cell by the first access node based at least in part on the discovery message; and
   reporting circuitry to send a message to a second access node, which serves the UE prior to provision of the service cell by the first access node based at least in part of the discovery message, to indicate that the first access node is available to serve the UE.

2. The apparatus of claim 1, wherein the processing circuitry is to initiate the transmission of at least one of a primary synchronization signal (PSS), a secondary synchronization signal (SSS), or a common reference signal (CRS) upon initiating provision of the service cell.

3. The apparatus of claim 1, wherein the first access node serves a first service area and the second access node serves a second service area; and
   wherein the first service area and the second service area at least partially overlap.

4. The apparatus of claim 3, wherein the first service area is smaller than the second service area.

5. The apparatus of claim 3, wherein the first service area is substantially equal to the second service area.

6. The apparatus of claim 1, wherein the message to the second access node includes a request for the second access node to initiate a handover procedure.

7. An apparatus to be implemented in a first access node, the apparatus comprising:
   communication circuitry to receive a discovery message from a user equipment (UE);
   processing circuitry to initiate provision of a service cell by the first access node based at least in part on the discovery message; and
   reporting circuitry to send a message to a second access node, which serves the UE prior to provision of the service cell by the first access node based at least in part of the discovery message, to indicate that the first access node is available to serve the UE, wherein the message to the second access node includes a request that information regarding the service cell provided by the first access node be included in a serving cell measurement configuration.

8. One or more non-transitory, computer-readable media having instructions that, when executed, cause a first access node to:
   process a discovery message received from a user equipment while the first access node is in a dormant state, wherein the first access node does not serve any UEs or transmit discovery messages while in the dormant state;
   initiate provision of a service cell to transition out of the dormant state based at least in part on the discovery message;
   send a message to a second access node, which serves the UE prior to provision of the service cell by the first access node, based at least in part on the discovery message, to indicate that the first access node is available to serve the UE.

9. The one or more non-transitory, computer-readable media of claim 8, wherein the instructions, when executed, further cause the first access node to initiate transmission of at least one of a primary synchronization signal (PSS), a secondary synchronization signal (SSS), or a common reference signal (CRS) upon initiating provision of the service cell.

10. The one or more non-transitory, computer-readable media of claim 8, wherein the first access node serves a first service area and the second access node serves a second service area; and
    wherein the first service area and the second service area at least partially overlap.

11. The one or more non-transitory, computer-readable media of claim 10, wherein the first service area is smaller than the second service area.

12. The one or more non-transitory, computer-readable media of claim 10, wherein the first service area is substantially equal to the second service area.

13. The one or more non-transitory, computer-readable media of claim 8, wherein the message to the second access node includes a request for the second access node to initiate a handover procedure.

14. The one or more non-transitory, computer-readable media of claim 8, wherein the message to the second access node includes a request that information regarding the service cell provided by the first access node be included in a serving cell measurement configuration.

\* \* \* \* \*